United States Patent
Ishida et al.

(10) Patent No.: US 11,760,074 B2
(45) Date of Patent: Sep. 19, 2023

(54) MOLD FOR PREPREG LAMINATION AND PREPREG LAMINATION METHOD

(71) Applicant: MITSUBISHI HEAVY INDUSTRIES, LTD., Tokyo (JP)

(72) Inventors: Kazuki Ishida, Tokyo (JP); Masahiko Shimizu, Tokyo (JP); Kohei Muto, Tokyo (JP); Akihito Suzuki, Tokyo (JP); Kenji Murakami, Tokyo (JP); Tsuyoshi Okawara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 340 days.

(21) Appl. No.: 17/045,249

(22) PCT Filed: Apr. 23, 2019

(86) PCT No.: PCT/JP2019/017120
§ 371 (c)(1),
(2) Date: Oct. 5, 2020

(87) PCT Pub. No.: WO2019/239724
PCT Pub. Date: Dec. 19, 2019

(65) Prior Publication Data
US 2021/0170637 A1    Jun. 10, 2021

(30) Foreign Application Priority Data
Jun. 15, 2018    (JP) .................................. 2018-114466

(51) Int. Cl.
*B32B 37/00* (2006.01)
*B29C 33/42* (2006.01)
(Continued)

(52) U.S. Cl.
CPC .......... *B32B 37/0046* (2013.01); *B29C 33/42* (2013.01); *B29C 43/203* (2013.01);
(Continued)

(58) Field of Classification Search
None
See application file for complete search history.

(56) References Cited

U.S. PATENT DOCUMENTS

| | | |
|---|---|---|
| 2010/0170989 A1 | 7/2010 | Gray |
| 2010/0284810 A1 | 11/2010 | Corman et al. |
| 2017/0297317 A1* | 10/2017 | Chapman ................ B32B 37/14 |

FOREIGN PATENT DOCUMENTS

| | | | |
|---|---|---|---|
| CN | 107953576 A * | 4/2018 | ............ B29C 70/48 |
| JP | H06-071742 A | 3/1994 | |

(Continued)

OTHER PUBLICATIONS

Europe Patent Office, "Search Report for European Patent Application No. 19820249.1" dated Jun. 16, 2021.
(Continued)

*Primary Examiner* — Barbara J Musser
(74) *Attorney, Agent, or Firm* — Manabu Kanesaka; Benjamin Hauptman; Kenneth Berner (57) ABSTRACT

This mold for prepreg lamination includes a first surface only having a surface flat along one direction; second surfaces having a surface flat along the one direction and disposed at a predetermined angle with respect to the first surface; and a third surface with a cross-sectional shape, which is a surface yielded from a cut in an orthogonal direction to the one direction, that is an arc, and with one end side connected to the first surface and the other end side connected to the second surface. First bend sections having a protruding shape are formed on the second surface and the third surface and serve as boundaries, and one of the surfaces is slanted relative to the other surfaces. On the third surface, the diameter of the arc on the other surface becomes gradually smaller as further away from the first bend section along the one direction.

8 Claims, 10 Drawing Sheets

(51) Int. Cl.
   *B29C 43/20*   (2006.01)
   *B29C 43/36*   (2006.01)
   *B29C 70/38*   (2006.01)
   *B29C 70/42*   (2006.01)
   *B29C 70/46*   (2006.01)
   *B29K 105/08*  (2006.01)

(52) U.S. Cl.
   CPC ............ *B29C 43/36* (2013.01); *B29C 70/386* (2013.01); *B29C 70/42* (2013.01); *B29C 70/46* (2013.01); *B29K 2105/0881* (2013.01)

(56) References Cited

FOREIGN PATENT DOCUMENTS

| | | |
|---|---|---|
| JP | 2008-230236 A | 10/2008 |
| JP | 2010-260780 A | 11/2010 |
| JP | 2011-179587 A | 9/2011 |
| JP | 5260593 B2 | 8/2013 |
| JP | 5686286 B2 | 3/2015 |

OTHER PUBLICATIONS

PCT/ISA/210, "International Search Report for International Application No. PCT/JP2019/017120," dated Aug. 6, 2019.

PCT/ISA/237, "Written Opinion of the International Searching Authority for International Application No. PCT/JP2019/017120," dated Aug. 6, 2019.

* cited by examiner

FLOATING AMOUNT OF ROLLER FROM CONTACT SURFACE

FIG. 10

Prior Art

FIG. 11

Prior Art

FIG. 12
Prior Art

OPENING ANGLE BETWEEN
ROLLER AND CONTACT SURFACE

FIG. 13
Prior Art

FLOATING AMOUNT OF ROLLER
FROM CONTACT SURFACE

MOLD FOR PREPREG LAMINATION AND PREPREG LAMINATION METHOD

RELATED APPLICATIONS

The present application is National Phase of International Application No. PCT/JP2019/017120 filed Apr. 23, 2019, and claims priority from Japanese Application No. 2018-114466, filed Jun. 15, 2018, the disclosure of which is hereby incorporated by reference herein in its entirety.

TECHNICAL FIELD

The present invention relates to a mold for prepreg lamination and a prepreg lamination method.

BACKGROUND ART

As a method of manufacturing a composite material, there is a technique of laminating a tape-shaped prepreg tape with a predetermined width multiple times on a mold using an automated fiber laminating device (AFP) or an automated tape laminating device (ATL). At this time, the tape fed from a head of the laminating device is compressed onto the mold by a compaction roller.

PTL 1 discloses a technique of manufacturing a mold based on a mold model, in which, as a result of the press molding, the shape of the mold model is modified such that wrinkles or cracks do not occur in a prepreg laminated product. PTL 2 discloses a technique relating to a composite spar for an aircraft wing including a web, an upper flange, and a lower flange, in which a region where there is too little or too much material is reduced in a final product by twisting a web surface so that a decrease in strength is suppressed.

CITATION LIST

Patent Literature

[PTL 1] Japanese Patent No. 5260593
[PTL 2] Japanese Patent No. 5686286

SUMMARY OF INVENTION

Technical Problem

Figure 10:
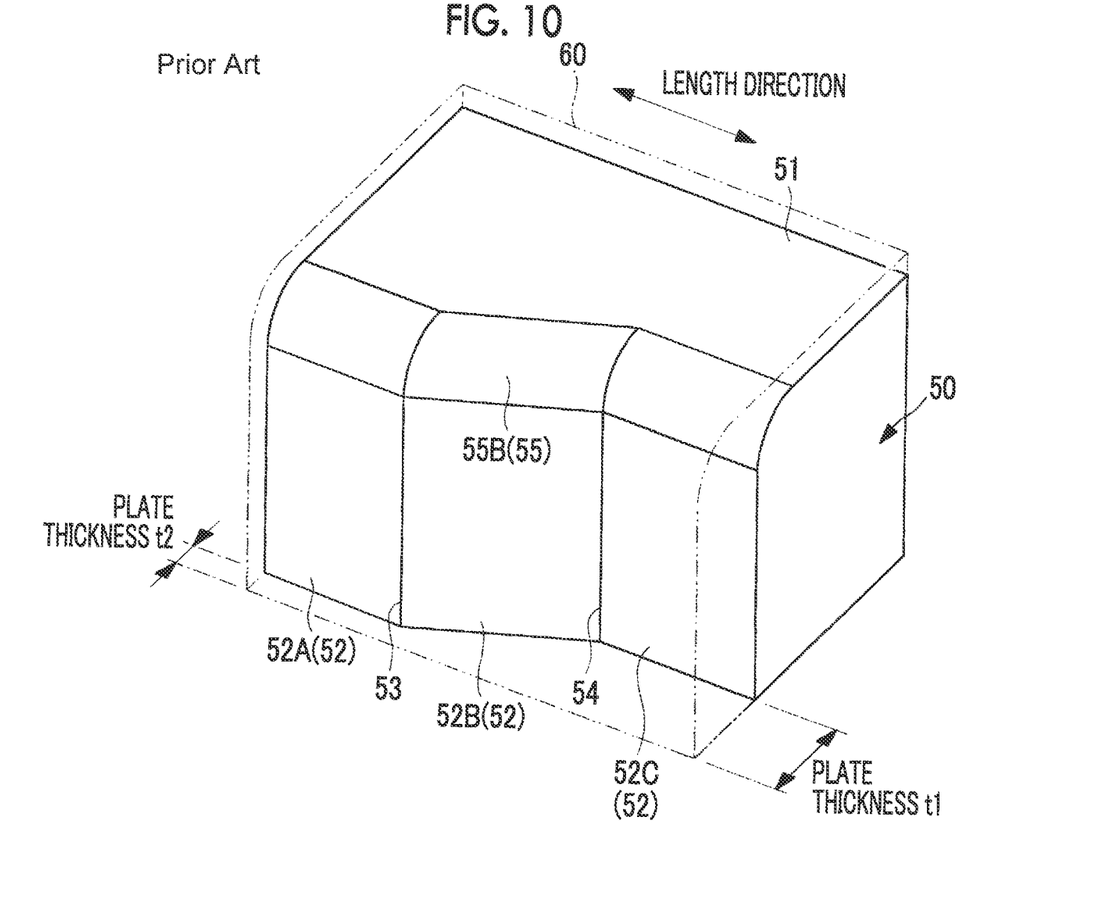
FIG. 10 is a perspective view illustrating a mold for prepreg lamination in the related art.
Figure 11:
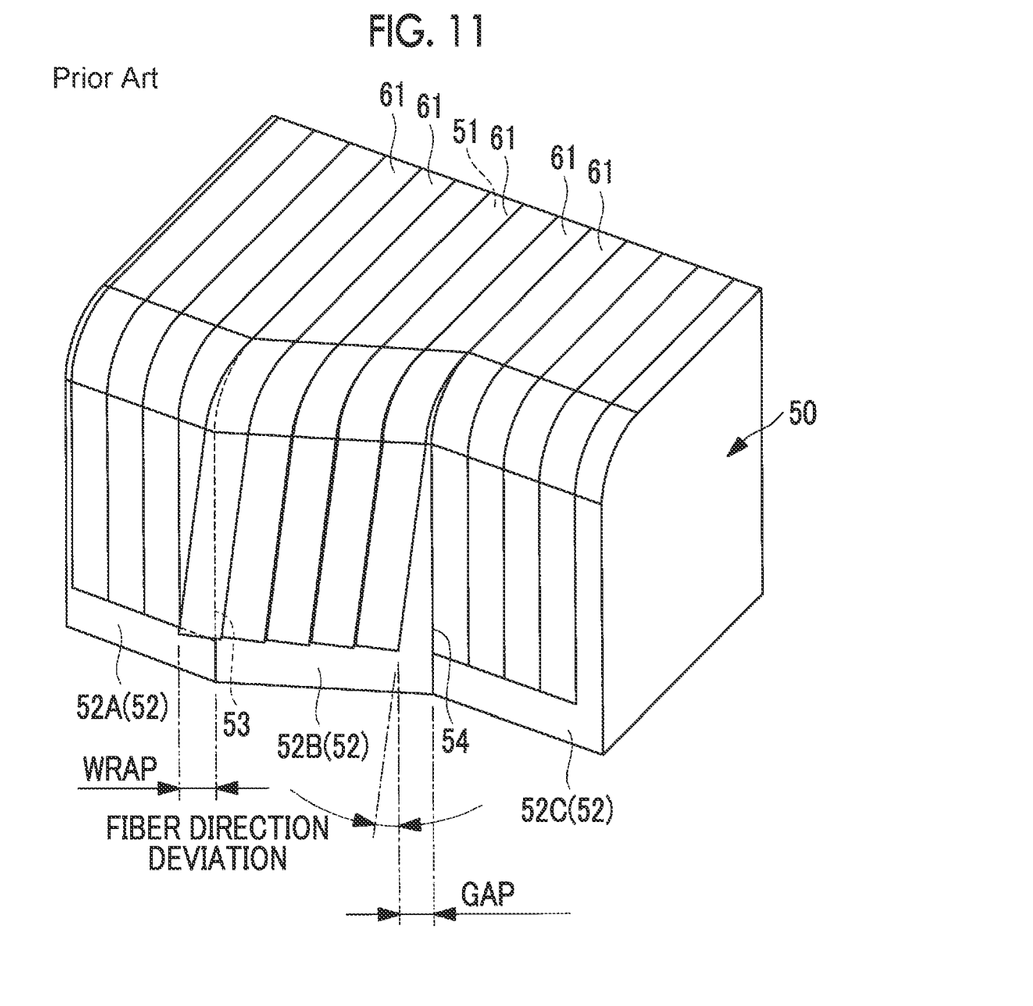
FIG. 11 is a perspective view illustrating the mold for prepreg lamination in the related art, and illustrates a state where the prepreg tapes are compressed on the surface.

As illustrated in FIG. 10, when a composite material molded article 60 has a shape in which two plate materials are combined at a predetermined angle (for example, 90°), a mold 50 for forming a molded article has an upper surface 51 and a side surface 52. As illustrated in FIG. 11, in a case where a prepreg tape 61 is compressed from the upper surface 51 toward the side surface 52 (or from the side surface 52 to the upper surface 51) of the mold 50 by the laminating device such as AFP, a plurality of tapes 61 can be compressed without generating a gap or a wrap (overlapping), on a portion where there is no bent part in a length direction on both the side surface 52 and the upper surface 51. In the example illustrated in FIG. 11, the plurality of tapes 61 are attached in parallel with a vertical direction on surfaces 52A and 52C.

On the other hand, in a case of providing a part where the plate thickness is changed along the length direction to the composite material molded article or a case where providing a stepped part along the length direction (plate thicknesses t1 and t2 in FIG. 10), the bent part is formed on the surface (side surface) of the mold. In the mold 50 illustrated in FIGS. 10 and 11, bent parts 53 and 54 are formed. In the mold 50, the side surfaces 52A and 52C on one side are inclined with respect to the other surface 52B with the bent parts 53 and 54 as boundaries. In this case, in a case where the prepreg tape 61 is compressed from the upper surface 51 toward the side surface 52 (or from the side surface 52 to the upper surface 51) of the mold 50 by the laminating device, a direction deviation is caused due to the inclination of an attachment direction of the tape 61, as illustrated in FIG. 11. As a result, a gap is generated between the plurality of tapes 61 or the plurality of tapes 61 overlap each other.

As a result, the strength of the molded article may be decreased or the surface of the molded article may have irregularities as compared with a case where the prepreg is uniformly laminated. There is a method of reducing the gap or overlapping generated between the tapes by steering a feed direction of the lamination tape or adding the lamination tape to the generated gap. However, in this method, it is necessary to narrow the width of the tape fed from the head of the laminating device or to reduce the number of tapes to be fed, the width and the number of tapes which can be compressed at the same time are reduced, and thus repetition of a compression process is increased. Accordingly, there is a problem that the time required for lamination is increased.

Figure 12:
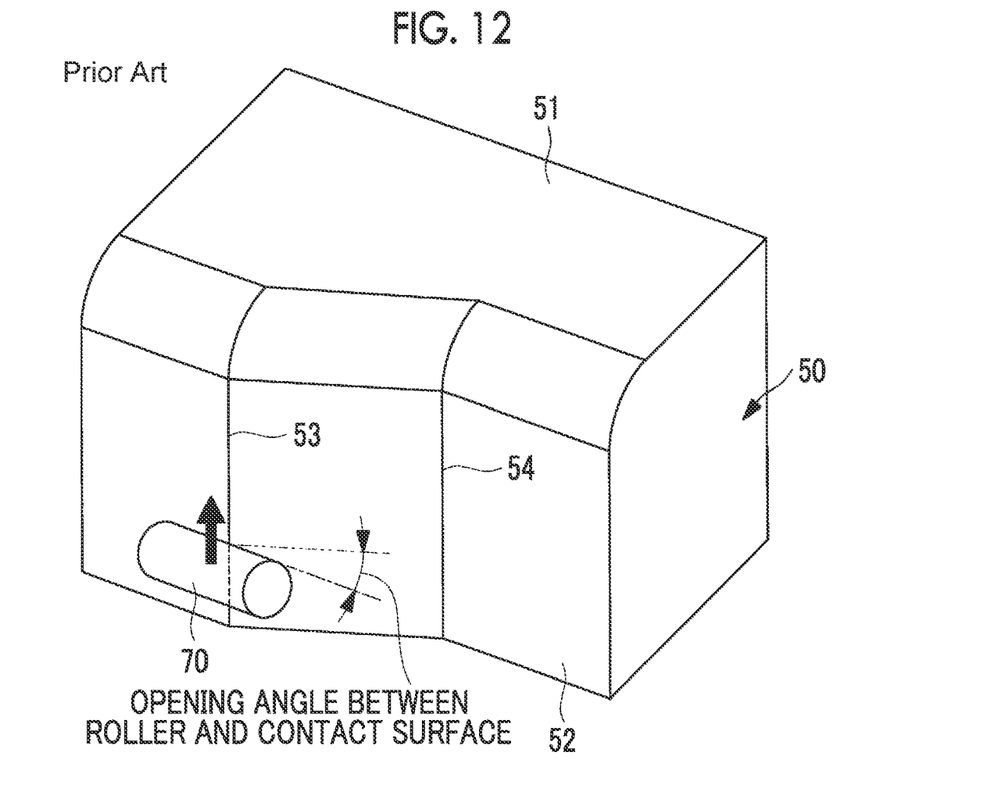
FIG. 12 is a perspective view illustrating the mold for prepreg lamination in the related art.
Figure 13:
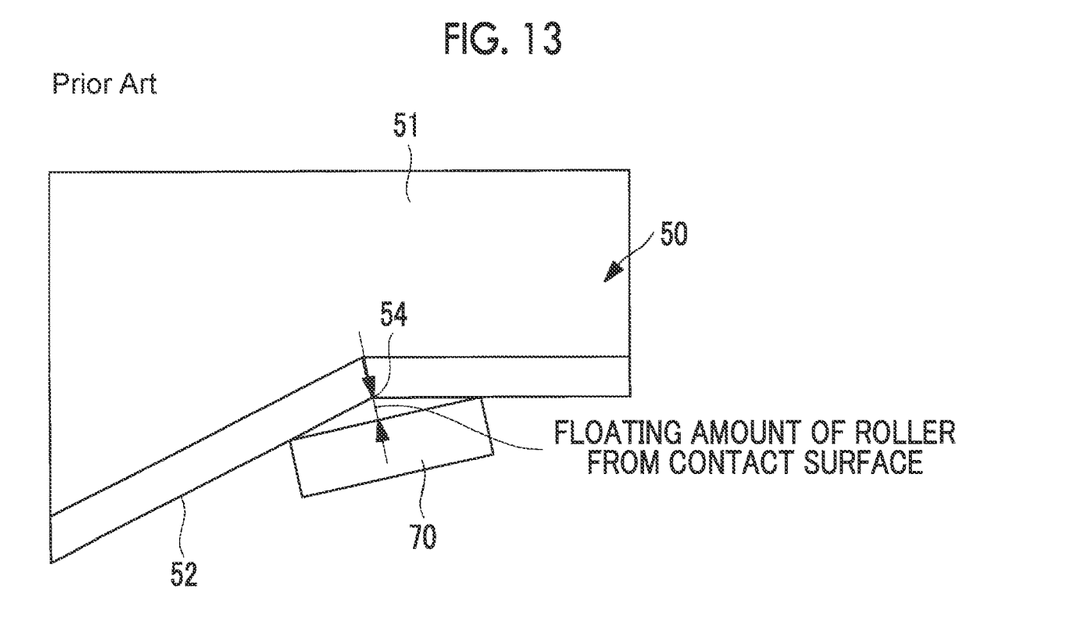
FIG. 13 is a plan view illustrating the mold for prepreg lamination in the related art.

As illustrated in FIGS. 12 and 13, in a case where the bent parts 53 and 54 are formed on the surface of the mold 50, in the bent parts 53 and 54, an opening occurs between a compaction roller 70 and the mold 50, and thus the compression of the tape by the compaction roller 70 tends to be insufficient.

The invention is made in view of such circumstances, and an object of the invention is to provide a mold for prepreg lamination and a prepreg lamination method which can reduce the gap generated between the plurality of tapes or the overlapping of the plurality of tapes by reducing the direction deviation of the attachment direction of the tape in a case where the prepreg tape is compressed on the surface of the mold having a bent part.

Solution to Problem

In order to solve the problem, a mold for prepreg lamination and a prepreg lamination method of the invention adopt the following means.

That is, a mold for prepreg lamination according to a first aspect of the invention includes a first surface having only a flat surface along one direction; a second surface which has a flat surface along the one direction and is disposed at a predetermined angle with respect to the first surface; and a third surface in which a cross-sectional shape of a surface cut in a direction orthogonal to the one direction is an arc, and which has one end side connected to the first surface and the other end side connected to the second surface, in which, in the second surface and the third surface, a protruding first bent part is formed, and one surface is inclined with respect to the other surface with the first bent part as a boundary, and a diameter of the arc of the other surface of the third surface is gradually reduced as a distance from the first bent part is increased along the one direction.

With this configuration, the third surface has one end side connected to the first surface having only a flat surface along the one direction, and the other end side connected to the second surface having only a flat surface along the one direction. Further, in the third surface, the cross-sectional shape of the surface cut in a direction orthogonal to the one direction is an arc, and in the second surface and the third surface, the protruding first bent part is formed, and the one surface is inclined with respect to the other surface with the first bent part as a boundary. The diameter of the arc of the other surface of the third surface is gradually reduced as the distance from the first bent part is increased along the one direction. As a result, in a case where the prepreg tape is compressed from the first surface toward the second surface (or from the second surface toward the first surface) of the mold by the laminating device, the attachment direction of the tape in the second surface is less likely to be inclined with respect to the vertical direction. Therefore, overlapping (wrap) of a plurality of tapes is reduced.

A mold for prepreg lamination according to a second aspect of the invention includes a first surface having only a flat surface along one direction; a second surface which has a flat surface along the one direction and is disposed at a predetermined angle with respect to the first surface; and a third surface in which a cross-sectional shape of a surface cut in a direction orthogonal to the one direction is an arc, and which has one end side connected to the first surface and the other end side connected to the second surface, in which, in the second surface and the third surface, a recessed second bent part is formed, and one surface is inclined with respect to the other surface with the second bent part as a boundary, and a diameter of the arc of the other surface of the third surface is gradually increased as a distance from the second bent part is increased along the one direction.

With this configuration, the third surface has one end side connected to the first surface having only a flat surface along the one direction, and the other end side connected to the second surface having only a flat surface along the one direction. Further, in the third surface, the cross-sectional shape of the surface cut in a direction orthogonal to the one direction is an arc, and in the second surface and the third surface, the recessed second bent part is formed, and the one surface is inclined with respect to the other surface with the second bent part as a boundary. The diameter of the arc of the other surface of the third surface is gradually increased as the distance from the second bent part is increased along the one direction. As a result, in a case where the prepreg tape is compressed from the first surface toward the second surface (or from the second surface toward the first surface) of the mold by the laminating device, the attachment direction of the tape in the second surface is less likely to be inclined with respect to the vertical direction. Therefore, the gap generated between a plurality of tapes is reduced.

In the first and second aspects, the first bent part or the second bent part may have a curved portion having a curved shape, and may be connected to the one surface and the other surface through the curved portion.

With this configuration, in a case of compressing the prepreg tape by the compaction roller, the contact surface of the roller is elastically deformed, and the contact surface comes into contact with flat portions on both sides with the bent part interposed therebetween, so that the tape can be compressed more.

A mold for prepreg lamination according to a third aspect of the invention includes a first surface having only a flat surface along one direction; a second surface which has a flat surface along the one direction and is disposed at a predetermined angle with respect to the first surface; and a third surface in which a cross-sectional shape of a surface cut in a direction orthogonal to the one direction is an arc, and which has one end side connected to the first surface and the other end side connected to the second surface, in which, in the second surface and the third surface, a protruding or recessed bent part is formed, and one surface is inclined with respect to the other surface with the bent part as a boundary, and the bent part has a curved portion having a curved shape, and is connected to the one surface and the other surface through the curved portion.

With this configuration, the third surface has one end side connected to the first surface having only a flat surface along the one direction, and the other end side connected to the second surface having only a flat surface along the one direction. Further, in the third surface, the cross-sectional shape of the surface cut in a direction orthogonal to the one direction is an arc, and in the second surface and the third surface, the protruding or recessed bent part is formed, and the one surface is inclined with respect to the other surface with the bent part as a boundary.

A prepreg lamination method according to a fourth aspect of the invention includes a step of attaching a tape-shaped prepreg tape to the first surface or the second surface of the above-described mold for prepreg lamination, and then attaching the prepreg tape to the third surface; and a step of attaching the prepreg tape to the second surface or the first surface after attaching the prepreg tape to the third surface.

A prepreg lamination method according to a fifth aspect of the invention includes a step of attaching a tape-shaped prepreg tape to the curved portion and the one surface or the other surface of the above-described mold for prepreg lamination, and compressing the prepreg tape using a compaction roller.

Advantageous Effects of Invention

It is possible to reduce a gap generated between a plurality of tapes or overlapping of the plurality of tapes by reducing the direction deviation of an attachment direction of the tape in a case where a prepreg tape is compressed on a surface of a mold having a bent part.

DESCRIPTION OF EMBODIMENTS

Hereinafter, embodiments of the invention will be described with reference to the drawings.

First Embodiment

Figure 1:
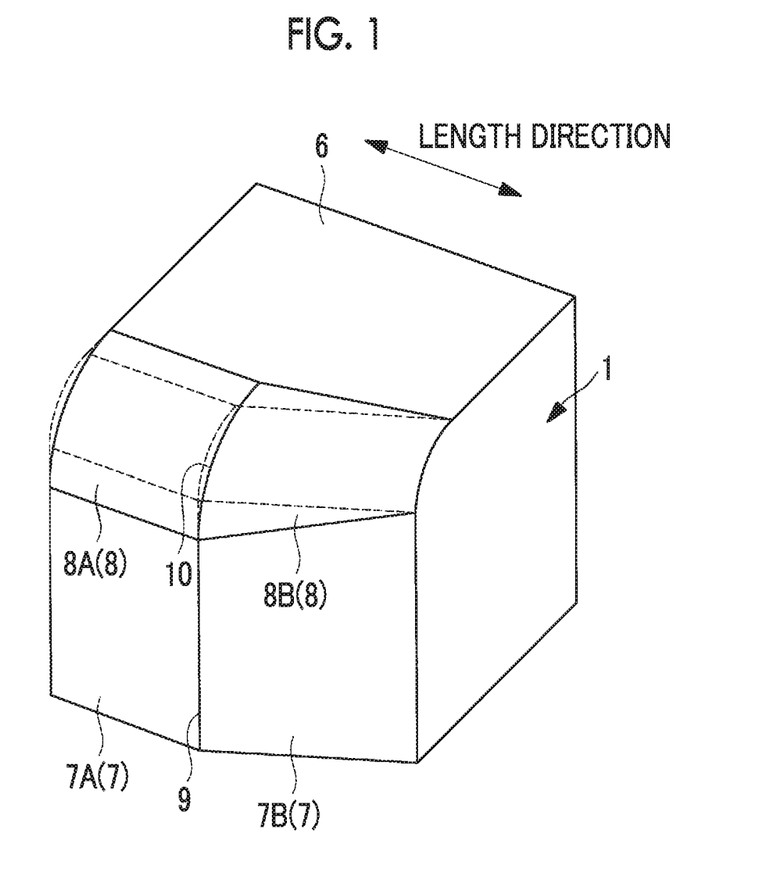
FIG. 1 is a perspective view illustrating a mold for prepreg lamination according to a first embodiment of the invention.
Figure 2:
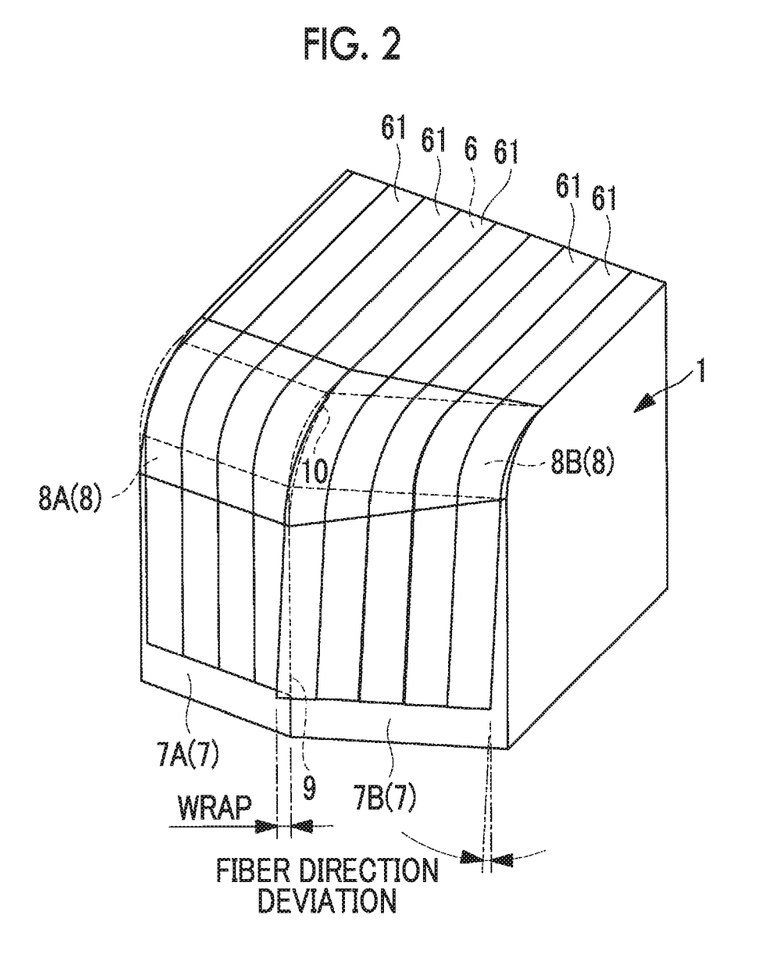
FIG. 2 is a perspective view illustrating the mold for prepreg lamination according to the first embodiment of the invention, and illustrates a state where prepreg tapes are compressed on a surface.

Hereinafter, a mold for prepreg lamination 1 according to a first embodiment of the invention will be described using FIGS. 1 and 2.

The mold for prepreg lamination 1 (hereinafter, referred to as a "mold 1") according to the embodiment is used in a case of laminating the prepreg, by a laminating device such as an automated fiber laminating device (AFP) or an automated tape laminating device (ATL). The laminating device such as the AFP feeds tape-shaped prepreg (hereinafter, referred to as "prepreg tape") 61 having a predetermined width to the surface of the mold for lamination. At this time, the prepreg tape 61 is continuously attached in one direction on the surface of the mold 1. The prepreg laminated in a plurality of layers is cured to be formed as a molded article.

When a composite material molded article has a shape in which two plate materials are combined at a predetermined angle (for example, 90°) (for example, when a part of the cross section has an L shape), the mold 1 for forming a molded article has a first surface 6 and a second surface 7. In a case where the prepreg tape 61 is attached to such a mold 1, the prepreg tape 61 is attached from the first surface 6 toward the second surface 7 (or from the second surface 7 toward the first surface 6) of the mold 1 as illustrated in FIG. 2. Further, the prepreg tape 61 fed from the laminating device is attached while being compressed by the compaction roller. A plurality of prepreg tapes 61 are disposed side by side along a length direction of the mold 1.

The mold 1 includes the first surface 6 having only a flat surface along the length direction, the second surface 7 which has a flat surface along the length direction and is disposed at a predetermined angle with respect to the first surface 6, and a third surface 8 formed between the first surface 6 and the second surface 7. Here, the molded article formed by the mold 1 is a long material that is long in one direction. Further, in a case where the first surface 6 is dispose to face an upward direction and the second surface 7 is disposed to face a lateral direction, the first surface 6 becomes an upper surface and the second surface 7 becomes a side surface.

The third surface 8 is a fillet surface, and is a curved surface in which the cross-sectional shape of the surface cut in a direction orthogonal to the length direction is an arc. The third surface 8 has one end side continuously connected to the first surface 6 and the other end side continuously connected to the second surface 7. The arc as the cross-sectional shape of the third surface 8 may be a part of a perfect circle or may be a part of an ellipse.

In a range of the length direction in which the first surface 6 only has the flat surface along the length direction, protruding first bent parts 9 and 10 are respectively formed on the second surface 7 and the third surface 8. In the second surface 7, one surface 7B is inclined with respect to the other surface 7A with the protruding first bent part 9 as a boundary, and in the third surface 8, one surface 8B is inclined with respect to the other surface 8A with the protruding first bent part 10 as a boundary. For example, the angle formed by the one surface 7B and the other surface 7A and the angle formed by the one surface 8B and the other surface 8A are greater than 180° and smaller than 270°.

The first bent part 9 is a part where the surface 7A and the surface 7B are combined, and has a linear shape. The first bent part 10 is a part where the surface 8A and the surface 8B are combined, and has a curved shape.

The diameter of the arc of the cross-sectional shape of the surface 8B of the third surface 8 is gradually reduced as the distance from the protruding first bent part 10 is increased along the length direction. As illustrated in FIG. 2, in a case where the prepreg tape 61 is compressed from the first surface 6 toward the second surface 7 (or from the second surface 7 toward the first surface 6) of the mold 1 by the laminating device, the length of the side end portion of the tape 61 attached on the surface 8B of the third surface 8 is shorter on a side far from the first bent part 10 than a side close to the first bent part 10. Therefore, as illustrated in FIG. 2, the attachment direction of the tape 61 in the surfaces 7A and 7B of the second surface 7 is less likely to be inclined with respect to the vertical direction as compared with a case where the arc of the cross-sectional shape of a surface 55B of a fillet surface 55 has the same diameter along the length direction as illustrated in FIG. 10. Therefore, the direction deviation is reduced, and the overlapping (wrap) of the plurality of tapes 61 is reduced.

According to the embodiment, since the overlapping (wrap) of the plurality of tapes 61 is reduced, after the prepregs are laminated, the unevenness of the lamination thickness is reduced. As a result, the strength of the cured molded article is less likely to be decreased, and irregularities occurring on the surface of the molded article are reduced. Further, unlike a case of using the mold 50 in which the direction deviation of the tape 61 is large as illustrated in FIG. 10, it is not necessary to narrow the width of the tape 61 fed from the head of the laminating device or to reduce the number of tapes 61 to be fed. Therefore, since it is not necessary to reduce the width or the number of tapes 61 which can be compressed at the same time, the repetition of the compression process is not increased, and the time required for lamination can be prevented from being increased.

Second Embodiment

Figure 3:
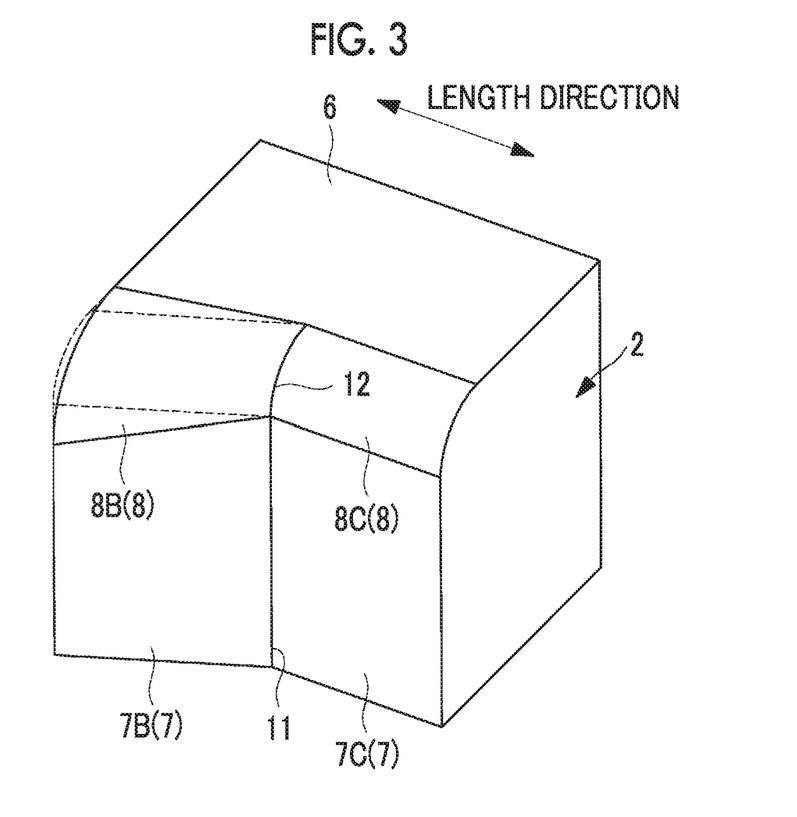
FIG. 3 is a perspective view illustrating a mold for prepreg lamination according to a second embodiment of the invention.
Figure 4:
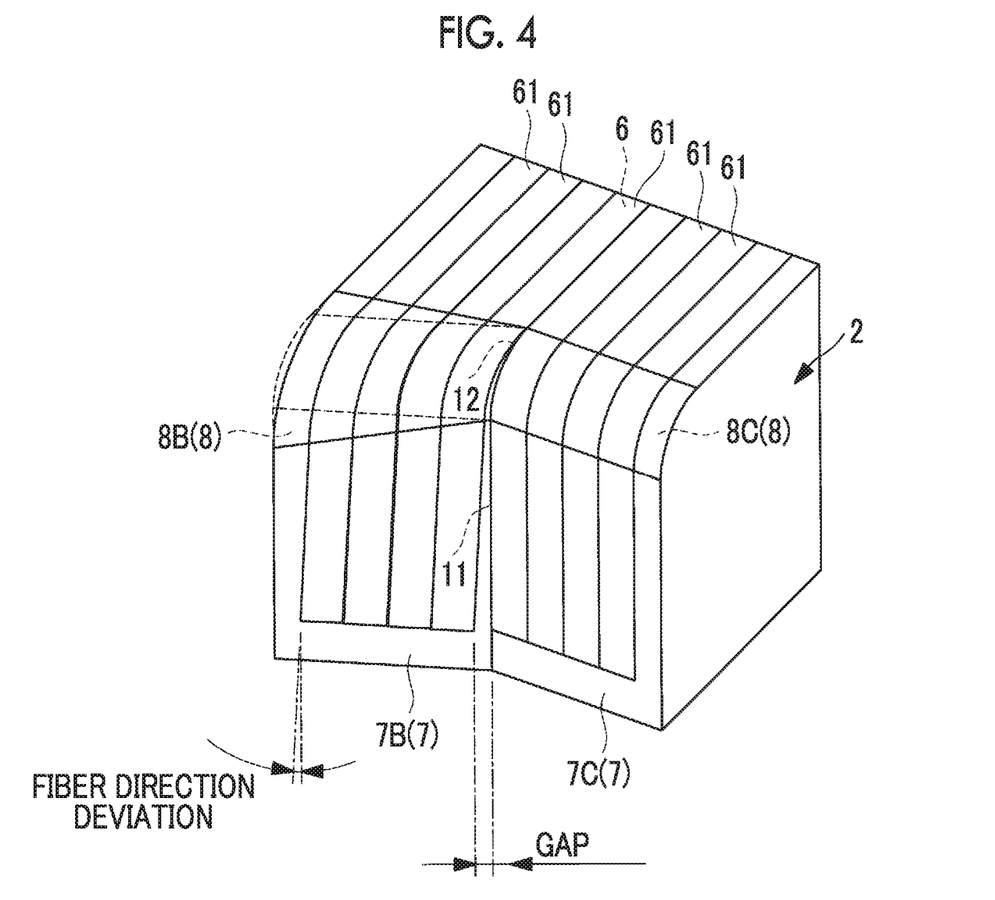
FIG. 4 is a perspective view illustrating the mold for prepreg lamination according to the second embodiment of the invention, and illustrates a state where the prepreg tapes are compressed on the surface.

Hereinafter, a mold for prepreg lamination 2 according to a second embodiment of the invention will be described using FIGS. 3 and 4. The detailed description of the configurations overlapping with those of the first embodiment is omitted.

As with the mold 1 of the first embodiment, the mold for prepreg lamination 2 (hereinafter, referred as a "mold 2") according to the embodiment is used when a composite material molded article has a shape in which two plate materials are combined at a predetermined angle (for example, 90°) (for example, when a part of the cross section has an L shape), the mold 2 for forming a molded article has the first surface 6, the second surface 7, and the third surface 8.

In a range of the length direction in which the first surface 6 only has the flat surface along the length direction, recessed second bent parts 11 and 12 are respectively formed on the second surface 7 and the third surface 8. In the second surface 7, one surface 7B is inclined with respect to the other surface 7C with the recessed second bent part 11 as a boundary, and in the third surface 8, one surface 8B is inclined with respect to the other surface 8C with the recessed second bent part 12 as a boundary. For example, the angle formed by the one surface 7B and the other surface 7C and the angle formed by the one surface 8B and the other surface 8C are greater than 90° and smaller than 180°.

The second bent part 11 is a part where the surface 7B and the surface 7C are combined, and has a linear shape. The second bent part 12 is a part where the surface 8B and the surface 8C are combined, and has a curved shape.

The diameter of the arc of the cross-sectional shape of the surface 8B of the third surface 8 is gradually increased as the distance from the recessed second bent part 12 is increased along the length direction. As illustrated in FIG. 4, in a case where the prepreg tape 61 is compressed from the first surface 6 toward the second surface 7 (or from the second surface 7 toward the first surface 6) of the mold 2 by the laminating device, the length of the side end portion of the tape 61 attached on the surface 8B of the third surface 8 is longer on a side far from the second bent part 12 than a side close to the second bent part 12. Therefore, as illustrated in FIG. 4, the attachment direction of the tape 61 in the surface 7B of the second surface 7 is less likely to be inclined with respect to the vertical direction as compared with a case where the arc of the cross-sectional shape of the surface 55B of the fillet surface 55 has the same diameter along the length direction as illustrated in FIG. 10. Therefore, the direction deviation is reduced, and the gap generated between the plurality of tapes 61 is reduced.

According to the embodiment, since the gap generated between the plurality of tapes 61 is reduced, after the prepregs are laminated, the strength of the cured molded article is less likely to be decreased and the irregularities occurring on the surface of the molded article are reduced. Further, unlike a case of using the mold 50 in which the direction deviation of the tape 61 is large, it is not necessary to narrow the width of the tape 61 fed from the head of the laminating device or to reduce the number of tapes 61 to be fed. Therefore, since it is not necessary to reduce the width or the number of tapes 61 which can be compressed at the same time, the repetition of the compression process is not increased, and the time required for lamination can be prevented from being increased.

Third Embodiment

Figure 5:
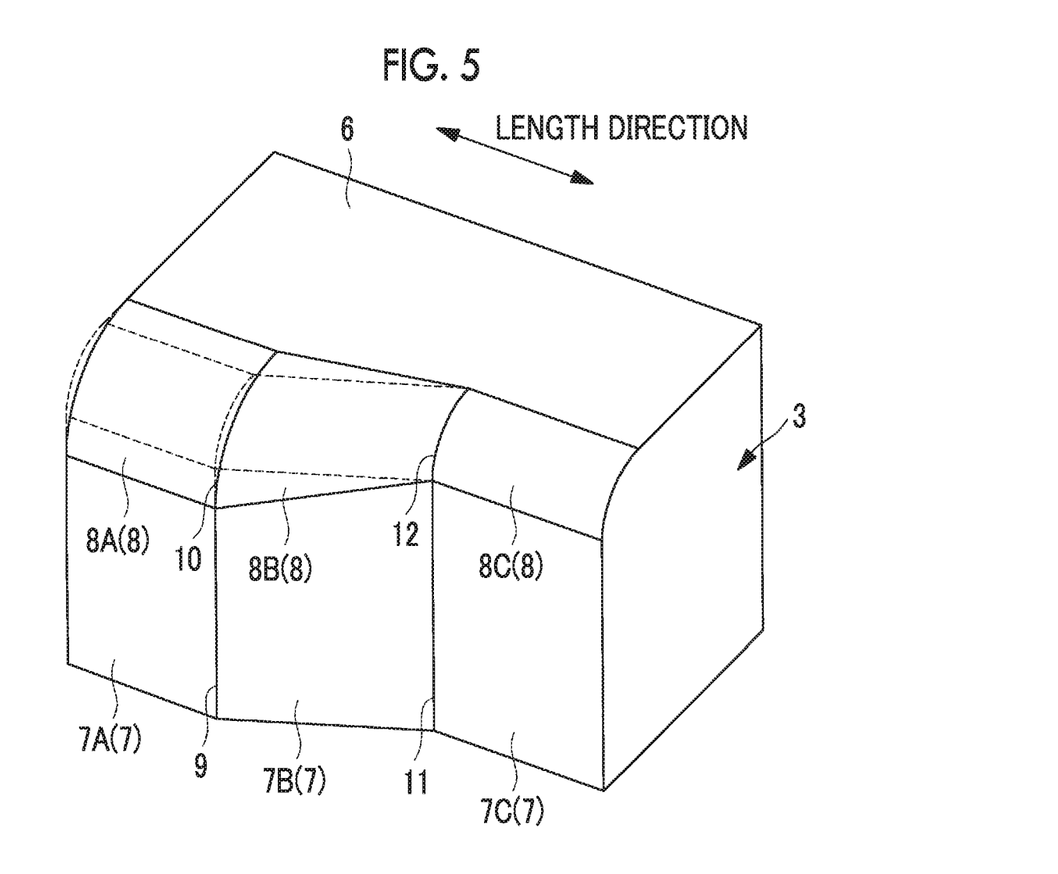
FIG. 5 is a perspective view illustrating a mold for prepreg lamination according to a third embodiment of the invention.

Hereinafter, a mold for prepreg lamination 3 according to a third embodiment of the invention will be described using FIGS. 5 and 6. The detailed description of the configurations overlapping with those of the first and second embodiments is omitted.

As with the molds 1 and 2 of the first and second embodiments, the mold for prepreg lamination 3 (hereinafter, referred to as a "mold 3") according to the embodiment is used when a composite material molded article has a shape in which two plate materials are combined at a predetermined angle (for example, 90°) (for example, when a part of the cross section has an L shape), the mold 3 for forming a molded article has the first surface 6, the second surface 7, and the third surface 8.

In the molds 1 and 2 according to the first and second embodiments described above, a case where the protruding first bent parts 9 and 10 or the recessed second bent parts 11 and 12 are formed on the second surface 7 and the third surface 8 has been described, but in this embodiment, both the protruding first bent parts 9 and 10 and the recessed second bent parts 11 and 12 are formed on one mold 3.

In the mold 3 according to the embodiment, in a range of the length direction in which the first surface 6 only has the flat surface along the length direction, the protruding first bent parts 9 and 10 are respectively formed on the second surface 7 and the third surface 8, and the recessed second bent parts 11 and 12 are respectively formed on the second surface 7 and the third surface 8. In a case where the prepreg is laminated on the mold 3 having the first bent parts 9 and 10 and the second bent parts 11 and 12 and the outer surface of the laminated prepreg is flush along the length direction, the outer surface of the molded article is flat, the plate thickness of the side surface of the molded article formed to correspond to the second surface 7 is gradually changed (becomes thick or thin) along the length direction. Further, in a case where the prepreg is laminated on the mold 3 having the first bent parts 9 and 10 and the second bent parts 11 and 12 and the plate thickness of the outer surface of the laminated prepreg is constant along the length direction, a stepped part is formed on the outer surface of the molded article.

The diameter of the arc of the cross-sectional shape of the surface 8B of the third surface 8 is gradually reduced as the distance from the protruding first bent part 10 is increased along the length direction, and is gradually increased as the distance from the recessed second bent part 12 is increased along the length direction. As illustrated in FIG. 6, in a case where the prepreg tape 61 is compressed from the first surface 6 toward the second surface 7 (or from the second surface 7 toward the first surface 6) of the mold 3 by the laminating device, the length of the side end portion of the tape 61 attached on the surface 8B of the third surface 8 is shorter on a side far from the first bent part 10 than a side close to the first bent part 10, and the length of the side end portion of the tape 61 attached on the surface 8B of the third surface 8 is longer on a side far from the second bent part 12 than a side close to the second bent part 12. On the other hand, as illustrated in FIG. 10, when the arc of the cross-sectional shape of the surface 55B of the fillet surface 55 has the same diameter along the length direction, the length of the side end portion of the tape 61 attached on the surface 55B of the fillet surface 55 is substantially the same on a side close to the first bent part 10 and a side far from the first bent part 10. Therefore, the deviation of the attachment direction of the tape 61 is large in the side surface 52.

Figure 6:
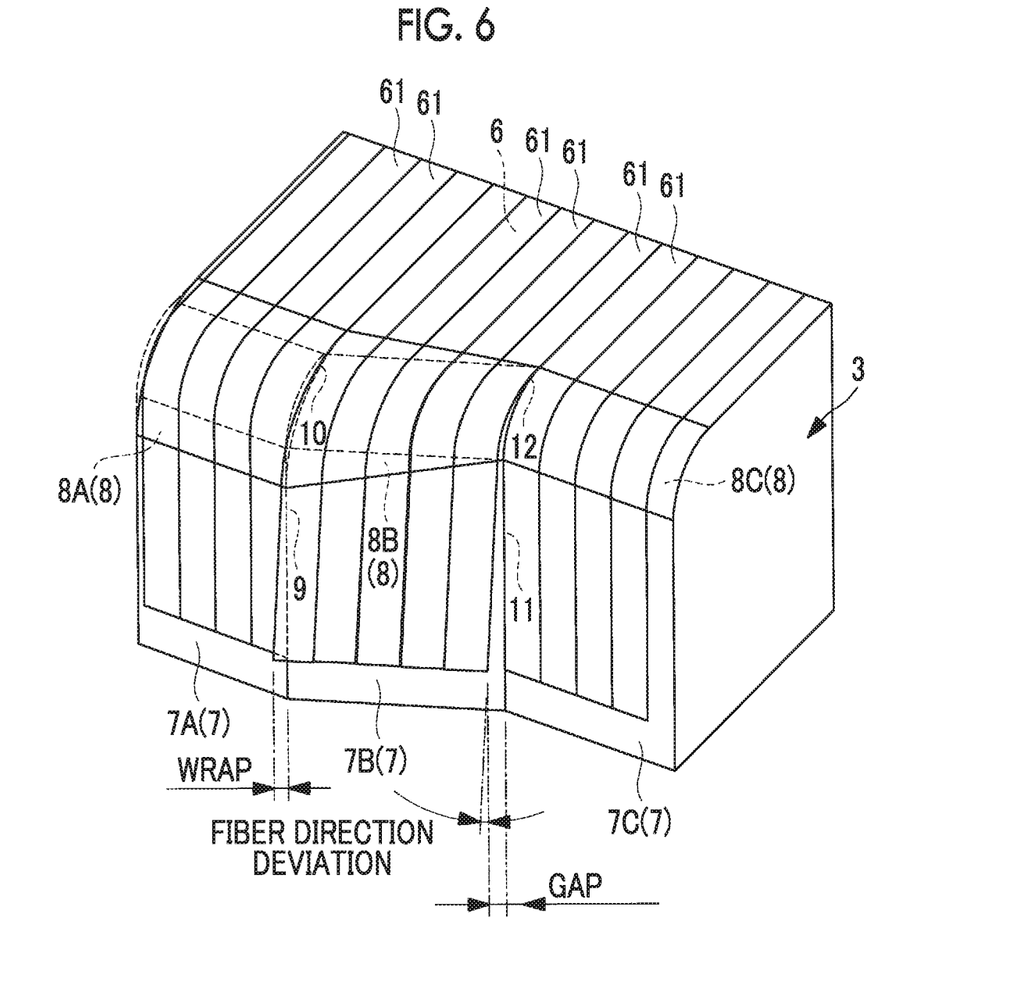
FIG. 6 is a perspective view illustrating the mold for prepreg lamination according to the third embodiment of the invention, and illustrates a state where the prepreg tapes are compressed on the surface.

In contrast, in this embodiment, as illustrated in FIG. 6, the attachment direction of the tape 61 in the surfaces 7A and 7B of the second surface 7 is less likely to be inclined with respect to the vertical direction as compared with a case where the arc of the cross-sectional shape of the surface 55B of the fillet surface 55 has the same diameter along the length direction as illustrated in FIG. 10. Therefore, the direction deviation is reduced, the overlapping (wrap) of the plurality of tapes 61 is reduced, and the gap generated between the plurality of tapes 61 is reduced.

According to the embodiment, since the overlapping (wrap) of the plurality of tapes 61 is reduced and the gap generated between the plurality of tapes 61 is reduced, after the prepregs are laminated, the unevenness of the lamination thickness is reduced. As a result, the strength of the cured molded article is less likely to be decreased, and irregularities occurring on the surface of the molded article are reduced. Further, unlike the case of using the mold 50 in which the direction deviation of the tape 61 is large, it is not necessary to narrow the width of the tape 61 fed from the head of the laminating device or to reduce the number of tapes 61 to be fed. Therefore, since it is not necessary to reduce the tapes 61 which can be compressed at the same time, the repetition of the compression process is not increased, and the time required for lamination can be prevented from being increased.

Fourth Embodiment

Hereinafter, a mold for prepreg lamination 4 and a mold for prepreg lamination 5 according to a fourth embodiment of the invention will be described using FIGS. 7 to 9.

In the first to third embodiments described above, the first bent part 9 or the second bent part 11 is a portion where both the flat surfaces 7A and 7B are combined or a portion where both the flat surfaces 7B and 7C are combined, and a straight line is formed in a ridge shape or a valley shape at the top of the protruding portion or the bottom of the recessed portion. In the first to third embodiments described above, the first bent part 10 or the second bent part 12 is a portion where both the curved surfaces 8A and 8B are combined or a portion where both the curved surfaces 8B and 8C are combined, and a curved line is formed in a ridge shape or a valley shape at the top of the protruding portion or the bottom of the recessed portion.

Figure 7:
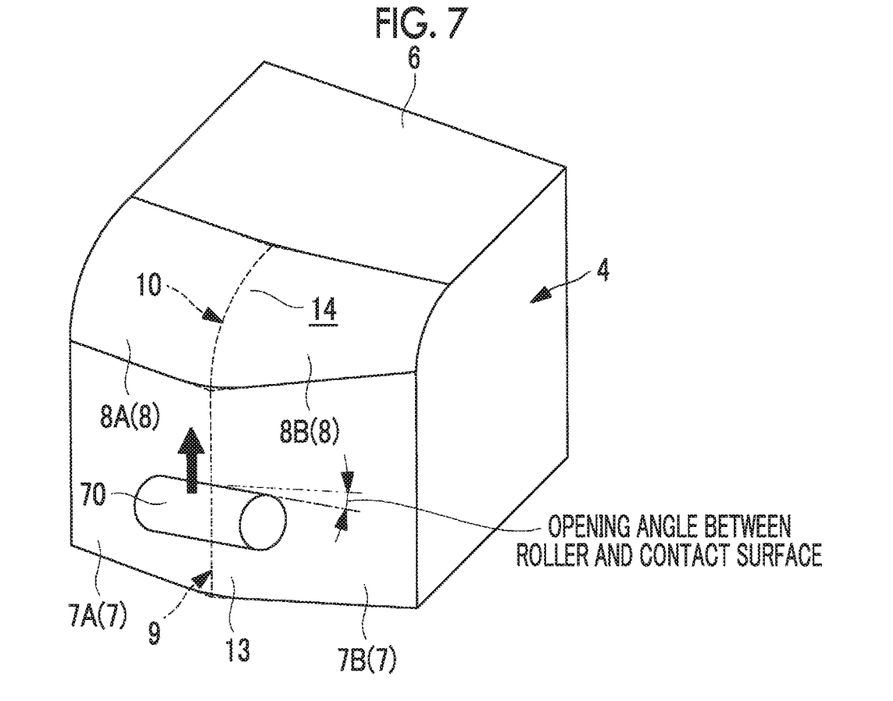
FIG. 7 is a perspective view illustrating a first example of a mold for prepreg lamination according to a fourth embodiment of the invention.
Figure 8:
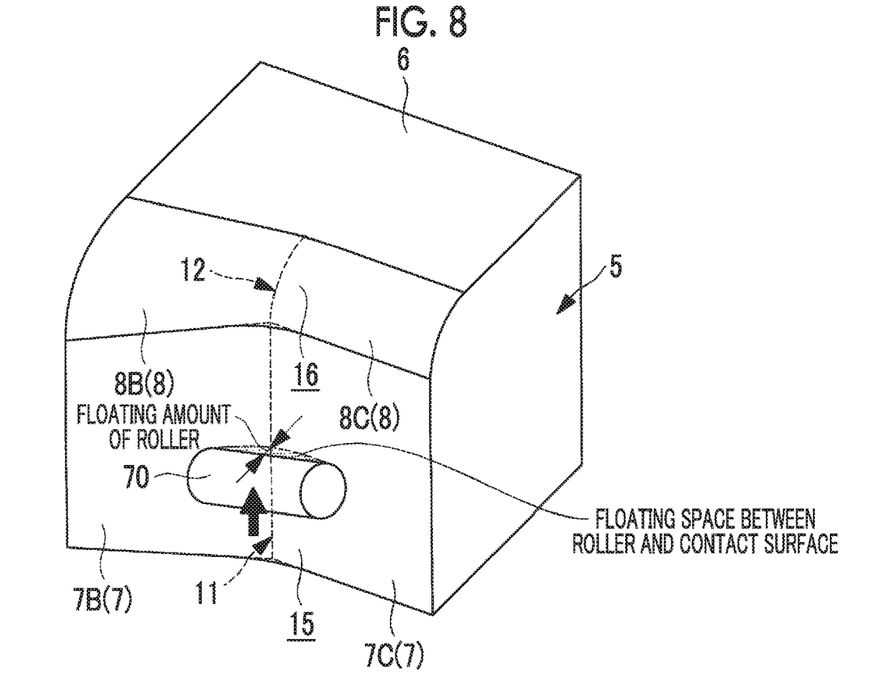
FIG. 8 is a perspective view illustrating a second example of the mold for prepreg lamination according to the fourth embodiment of the invention.
Figure 9:
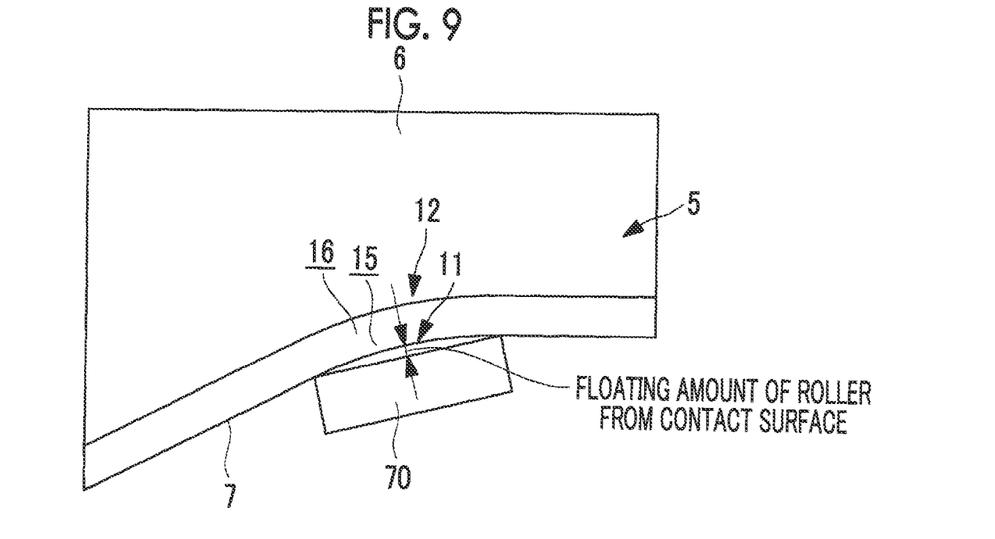
FIG. 9 is a plan view illustrating the second example of the mold for prepreg lamination according to the fourth embodiment of the invention.

In contrast, in this embodiment, as illustrated in FIGS. 7 to 9, in the first bent part 9 or the second bent part 11, a protruding curved portion 13 or a recessed curved portion 15 is formed such that a straight line is not formed at the top of the protruding portion or the bottom of the recessed portion. Further, in the first bent part 10 or the second bent part 12, a protruding curved portion 14 or a recessed curved portion 16 is formed such that a curved line is not formed at the top of the protruding portion or the bottom of the recessed portion.

The first bent part 9 is connected to the one surface 7A and the other surface 7B through the protruding curved portion 13, and the first bent part 10 is connected to the one surface 8A and the other surface 8B through the protruding curved portion 14. The second bent part 11 is connected to the one surface 7C and the other surface 7B through the recessed curved portion 15, and the second bent part 12 is connected to the one surface 8C and the other surface 8B through the recessed curved portion 16.

The protruding curved portions 13 and 14 or the recessed curved portions 15 and 16 are fillet surfaces, and are curved surfaces in which the cross-sectional shape of the surface cut in a direction in parallel with the length direction is an arc. The one surface 7A and the other surface 7B are smoothly connected through the protruding curved portion 13, and the one surface 8A and the other surface 8B are smoothly connected through the protruding curved portion 14. The one surface 7C and the other surface 7B are smoothly connected through the recessed curved portion 15, and the one surface 8C and the other surface 8B are smoothly connected through the recessed curved portion 16. The arc as the cross-sectional shape of the protruding curved portions 13 and 14 or the recessed curved portions 15 and 16 may be a part of a perfect circle or may be a part of an ellipse.

As in the first to third embodiments, in a case where the top of the first bent parts 9 and 10 or the bottom of the second bent parts 11 and 12 is formed in a straight line or a curved line on the surface of the mold 1, 2, or 3, it is difficult for the contact surface of the compaction roller 70 to come into contact with the surface of the mold 1, 2, or 3 on both sides of the first bent parts 9 and 10 or both sides of the second bent parts 11 and 12. As a result, the compression of the tape 61 by the compaction roller 70 tends to be insufficient.

On the other hand, according to this embodiment, an angle formed by the tangent planes of the curved portions 13 and 14 and the one surfaces 7A and 8A of the first bent parts 9 and 10 is smaller than an angle formed by the one surfaces 7A and 8A and the other surfaces 7B and 7C of the first bent parts 9 and 10 in a case where the curved portions 13 and 14 are not provided. The same applies to an angle formed by the tangent planes of the curved portions 13 and 14 and the other surfaces 7B and 8B of the first bent parts 9 and 10, and an angle formed by the tangent planes of the curved portions 15 and 16 and the one surfaces 7C and 8C or the other surfaces 7B and 8B of the second bent parts 11 and 12. The direction of the tangent line of the protruding curved portions 13 and 14 or the recessed curved portions 15 and 16 is gradually changed along the length direction. It is easy for the contact surface of the compaction roller 70 to come into contact with the surface of the mold 4 or 5 on both sides of the first bent parts 9 and 10 or both sides of the second bent parts 11 and 12. Accordingly, it is possible reliably perform the compression of the tape 61 by the compaction roller 70 on both sides of the first bent parts 9 and 10 or both sides of the second bent parts 11 and 12.

REFERENCE SIGNS LIST

1, 2, 3, 4, 5: mold for prepreg lamination
6: first surface
7: second surface
8: third surface
9, 10: first bent part
11, 12: second bent part
13, 14, 15, 16: curved portion
50: mold
51: upper surface
52: side surface
53, 54: bent part
55: fillet surface
60: molded article
61: prepreg tape
70: compaction roller

The invention claimed is:
1. A mold for prepreg lamination comprising:
a first surface having only a flat surface along one direction;
a second surface which has a flat surface along the one direction and is disposed at a predetermined angle with respect to the first surface; and
a third surface in which a cross-sectional shape of a surface cut in a direction orthogonal to the one direction is an arc, and which has one end side connected to the first surface and the other end side connected to the second surface,
wherein, in the second surface and the third surface, a protruding first bent part is formed, and one surface is inclined with respect to the other surface with the first bent part as a boundary, and a diameter of the arc of the other surface of the third surface is gradually reduced as a distance from the first bent part is increased along the one direction.

2. The mold for prepreg lamination according to claim 1, wherein the first bent part has a curved portion having a curved shape, and is connected to the one surface and the other surface through the curved portion.

3. A prepreg lamination method comprising:
a step of attaching a prepreg tape to the curved portion and the one surface or the other surface of the mold for prepreg lamination according to claim 2, and compressing the prepreg tape using a compaction roller.

4. A prepreg lamination method comprising:
a step of attaching a prepreg tape to the first surface or the second surface of the mold for prepreg lamination according to claim 1, and then attaching the prepreg tape to the third surface; and
a step of attaching the prepreg tape to the second surface or the first surface after attaching the prepreg tape to the third surface.

5. A mold for prepreg lamination comprising:
a first surface having only a flat surface along one direction;
a second surface which has a flat surface along the one direction and is disposed at a predetermined angle with respect to the first surface; and
a third surface in which a cross-sectional shape of a surface cut in a direction orthogonal to the one direction is an arc, and which has one end side connected to the first surface and the other end side connected to the second surface,
wherein, in the second surface and the third surface, a recessed second bent part is formed, and one surface is inclined with respect to the other surface with the second bent part as a boundary, and
a diameter of the arc of the other surface of the third surface is gradually increased as a distance from the second bent part is increased along the one direction.

6. The mold for prepreg lamination according to claim 5, wherein the second bent part has a curved portion having a curved shape, and is connected to the one surface and the other surface through the curved portion.

7. A prepreg lamination method comprising:
a step of attaching a prepreg tape to the curved portion and the one surface or the other surface of the mold for prepreg lamination according to claim 6, and compressing the prepreg tape using a compaction roller.

8. A prepreg lamination method comprising:
a step of attaching a prepreg tape to the first surface or the second surface of the mold for prepreg lamination according to claim 5, and then attaching the prepreg tape to the third surface; and
a step of attaching the prepreg tape to the second surface or the first surface after attaching the prepreg tape to the third surface.

* * * * *